(12) United States Patent
Kim

(10) Patent No.: US 10,253,943 B2
(45) Date of Patent: Apr. 9, 2019

(54) VEHICLE LAMP

(71) Applicant: LG INNOTEK CO., LTD., Seoul (KR)

(72) Inventor: Sung Min Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/329,545

(22) PCT Filed: Jul. 31, 2015

(86) PCT No.: PCT/KR2015/008039
§ 371 (c)(1),
(2) Date: Jan. 26, 2017

(87) PCT Pub. No.: WO2016/018119
PCT Pub. Date: Feb. 4, 2016

(65) Prior Publication Data
US 2017/0211778 A1 Jul. 27, 2017

(30) Foreign Application Priority Data
Jul. 31, 2014 (KR) .................. 10-2014-0098435

(51) Int. Cl.
*F21S 45/48* (2018.01)
*F21S 45/47* (2018.01)
(Continued)

(52) U.S. Cl.
CPC ............. *F21S 45/47* (2018.01); *B60Q 1/04* (2013.01); *B60Q 1/2696* (2013.01);
(Continued)

(58) Field of Classification Search
CPC ...... F21S 48/211; F21S 48/212; F21S 48/215; F21S 48/321; B60Q 1/2696
See application file for complete search history.

(56) References Cited

U.S. PATENT DOCUMENTS

2004/0202007 A1* 10/2004 Yagi ..................... F21S 48/1159
362/545
2007/0091632 A1* 4/2007 Glovatsky ............ B60Q 1/0052
362/547
(Continued)

FOREIGN PATENT DOCUMENTS

JP 2008084700 * 9/2006 ............. F21V 29/00
JP 2009021135 * 7/2007 ............. F21V 29/02
(Continued)

OTHER PUBLICATIONS

English Machine Translation of JP 2009021135 provided by Espacenet.*
(Continued)

*Primary Examiner* — Zheng Song
(74) *Attorney, Agent, or Firm* — KED & Associates, LLP

(57) ABSTRACT

The present invention provides a vehicle lamp including a plurality of light sources which are arranged in a length direction; a bezel unit formed to be elongated along the light sources, made of a thermally conductive material, and including a thermal radiation region; a radiation plate mounted on each of the plurality of the light sources; and an insert unit configured to connect the radiation plate and the bezel unit to transfer heat generated by the radiation plate to the bezel unit, wherein a ratio of a thickness of the radiation plate to that of the insert unit is 5:2 so that an advantageous effect in which heat is induced to be effectively transferred from the radiation plate to the insert unit.

7 Claims, 4 Drawing Sheets

(51) Int. Cl.

| | | |
|---|---|---|
| *F21S 41/141* | (2018.01) | |
| *F21S 43/14* | (2018.01) | |
| *F21S 41/50* | (2018.01) | |
| *B60Q 1/04* | (2006.01) | |
| *F21V 29/503* | (2015.01) | |
| *F21V 29/70* | (2015.01) | |
| *F21V 29/89* | (2015.01) | |
| *B60Q 1/26* | (2006.01) | |
| *B60Q 1/30* | (2006.01) | |

(52) U.S. Cl.
CPC ............ *F21S 41/141* (2018.01); *F21S 41/50* (2018.01); *F21S 43/14* (2018.01); *F21S 45/48* (2018.01); *F21V 29/503* (2015.01); *F21V 29/70* (2015.01); *F21V 29/89* (2015.01); *B60Q 1/30* (2013.01)

(56) References Cited

U.S. PATENT DOCUMENTS

| | | | |
|---|---|---|---|
| 2010/0296306 A1 | 11/2010 | Toyoyama et al. | |
| 2011/0051453 A1* | 3/2011 | Nagasawa | B60Q 1/007 362/547 |
| 2012/0134167 A1 | 5/2012 | Huang | |
| 2013/0135882 A1* | 5/2013 | Choi | B60Q 1/2696 362/487 |
| 2014/0020882 A1* | 1/2014 | Konishi | H01L 33/642 165/185 |
| 2015/0103539 A1* | 4/2015 | Lee | F21S 48/00 362/382 |
| 2015/0103552 A1* | 4/2015 | Aiso | F21V 29/004 362/549 |
| 2016/0009216 A1* | 1/2016 | Song | F21V 19/00 362/516 |
| 2016/0054078 A1* | 2/2016 | Hattori | F21V 29/89 362/373 |

FOREIGN PATENT DOCUMENTS

| | | |
|---|---|---|
| KR | 10-2014-0003029 | 1/2014 |
| KR | 10-1371539 | 3/2014 |
| KR | 10-1397604 | 5/2014 |

OTHER PUBLICATIONS

English Machine Translation of JP 2008084700 provided by Espacenet.*
International Search Report (with English translation) and Written Opinion dated Nov. 16, 2015 issued in Application No. PCT/KR2015/008041.

* cited by examiner

VEHICLE LAMP

CROSS-REFERENCE TO RELATED PATENT APPLICATIONS

This application is a U.S. National Stage Application under 35 U.S.C § 371 of PCT Application No. PCT/KR2015/008039, filed Jul. 31, 2015, which claims priority to Korean Patent Application No. 10-2014-0098435, filed Jul. 31, 2014, whose entire disclosures are hereby incorporated by reference.

TECHNICAL FIELD

The present invention relates to a vehicle lamp, and more particularly, to a vehicle lamp including a heat sink unit.

BACKGROUND ART

Generally, vehicle lamps are mainly classified into a head lamp installed at the front of a vehicle and a tail lamp installed at the rear of a vehicle. Generally, head lamps are mounted at both sides of the front of a vehicle to secure visibility of a driver in a traveling direction when the driver drives at night.

Light emitting diodes (LEDs) can be used as a light source of a recent vehicle lamp. Since a color temperature of a vehicle lamp using LEDs is approximately 5500 K, which is similar to that of sunlight, there is an advantage in minimizing fatigue of human eyes. In addition, since a vehicle lamp including LEDs is small, a degree of freedom of lamp design is high, and the lamp is also economical due to its semi-permanent lifetime.

Such LEDs are typically manufactured in a module form. In addition, the LED module is assembled with an LED heat sink module to suitably dissipate heat radiated from the LED. Generally, the LED heat sink module has a shape of a planar plate in which a plurality of cooling fins protrude from one side surface thereof In addition, the cooling fins are cooled in a convection manner by a fan disposed behind the lamp.

However, since the fan and a convection space have to be provided in such a cooling structure of a vehicle lamp, there are problems in that a spatial limitation is large in lamp design, and a weight and a manufacturing cost thereof increase.

DISCLOSURE

Technical Problem

The present invention is directed to providing a vehicle lamp capable of securing heat sink efficiency and eliminating a spatial limitation in lamp design. In addition, the present invention is also directed to a vehicle lamp capable of reducing a weight and a manufacturing cost thereof The scope of the present invention is not limited to the above-described objects, and other unmentioned objects may be clearly understood by those skilled in the art from the following descriptions.

Technical Solution

One aspect of the present invention provides a vehicle lamp including a plurality of light sources which are arranged in a length direction, a bezel unit formed to be elongated along the light sources, made of a thermally conductive material, and including a thermal radiation region, a radiation plate mounted on each of the plurality of the light sources, and an insert unit configured to connect the radiation plate and the bezel unit to transfer heat generated by the radiation plate to the bezel unit, wherein a ratio of a thickness of the radiation plate to that of the insert unit is 5:2.

The radiation plate may be made of aluminum.

The insert unit may be made of aluminum.

The insert unit may be perpendicularly coupled to the radiation plate.

The light source may include a light emitting diode (LED).

Another aspect of the present invention provides a plurality of light sources which are vertically arranged, a bezel unit configured to surround the light sources, made of a thermally conductive material, and including a thermal radiation region, a radiation plate mounted on each of the plurality of the light sources, and at least two insert units configured to connect the radiation plates and the bezel unit, disposed to be spaced apart from each other, and configured to transfer heat generated by the radiation plates to the bezel unit, wherein a ratio of a thickness of the radiation plate to a separation distance between the insert units is 1:2.

The radiation plate may be made of aluminum.

A side surface of the bezel unit may include a plurality of side ribs spaced apart from each other.

The insert unit may be perpendicularly coupled to the side rib of the bezel unit The light source may include a light emitting diode.

Advantageous Effects

In a first embodiment of the present invention, a vehicle lamp in a beam combination type is formed such that a ratio of a thickness of a radiation plate to that of an insert unit is 5:2 to provide an advantageous effect in which heat is induced to be effectively transferred from the radiation plate to the insert unit.

In addition, in a second embodiment of the present invention, a vehicle lamp in a projection type is formed such that a ratio of thickness of a radiation plate to that of an insert unit is 1:2 to provide an advantageous effect in which a weight thereof is reduced and heat is induced to be effectively transferred from the radiation plate to the insert unit.

MODES OF THE INVENTION

Hereinafter, an exemplary embodiment of the present invention will be described with reference to the accompanying drawings in detail. Purposes, specific advantages, and novel features of the invention will be made clear from exemplary embodiments and the following detailed description in connection with the accompanying drawings. Terms and words used in this specification and claims thereof are not to be interpreted as limited to commonly used meanings or meanings in dictionaries, and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

The terminology used herein to describe embodiments of the invention is not intended to limit the scope of the invention. The articles "a" and "an" are singular in that they have a single referent, however the use of the singular form in the present document does not preclude the presence of more than one referent. In other words, elements of the invention referred to in the singular may number one or more unless context clearly indicates otherwise. It should be further understood that the terms "comprise," "comprising," "include," and/or "including" specify the presence of stated features, numbers, steps, operations, elements, and/or components when used herein, but do not preclude the presence or addition of one or more other features, numbers, steps, operations, elements, components, and/or groups thereof.

When a light emitting diode (LED) is used as a light source of a vehicle lamp, a unit configured to discharge heat generated by the LED is necessarily provided. This is because an LED is a component which generates much heat, and thus a lifetime of the LED may be decreased due to a high temperature heat that is radiated. Conventionally, a structure in which a radiation fin is disposed on an LED substrate and a fan for blowing air is included therein is provided behind the lamp as a heat sink unit. However, such a heat sink unit causes a large spatial limitation in lamp design for enhancing aesthetics and an increase in weight and manufacturing cost.

A vehicle lamp according to one exemplary embodiment the present invention is proposed for the purpose of eliminating conventional radiation fins and a fan and discharging heat generated by an LED to an outside of a vehicle rather than an inside thereof to solve such a spatial limitation and increase in weight and manufacturing cost.

Figure 1:
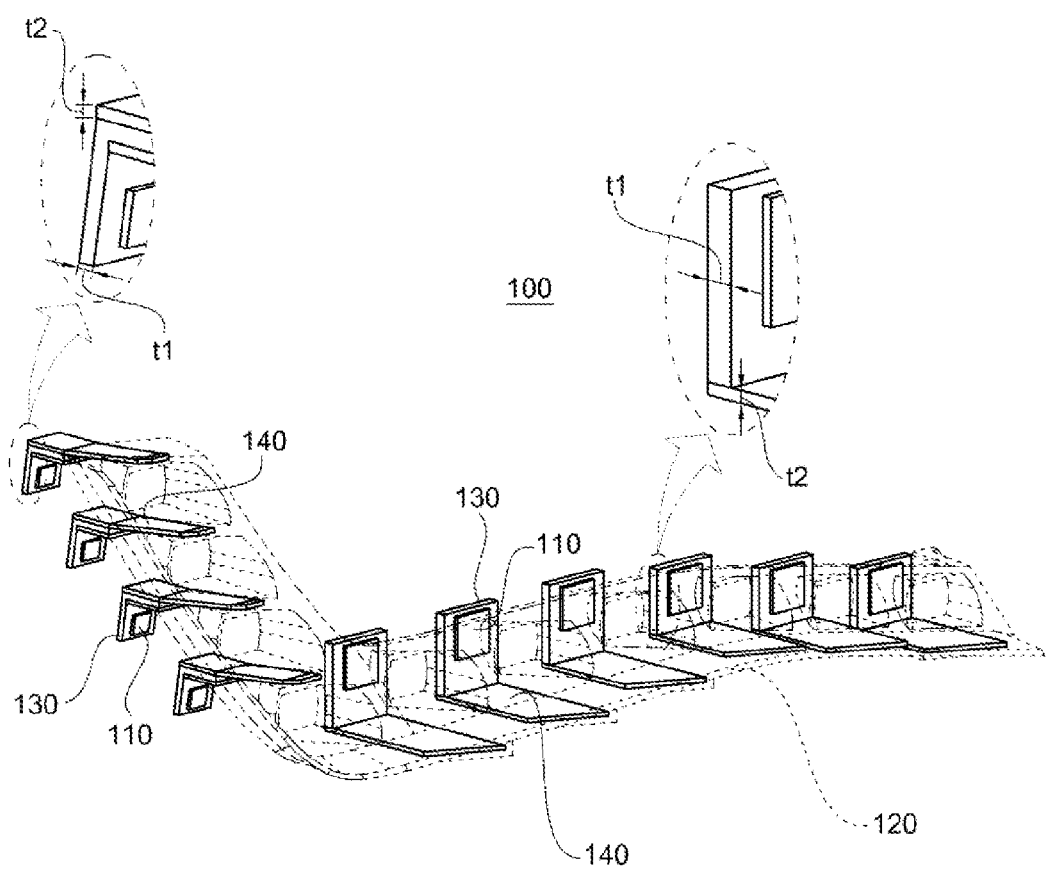
FIG. 1 is a view illustrating a vehicle lamp according to a first exemplary embodiment of the present invention.
Figure 2:
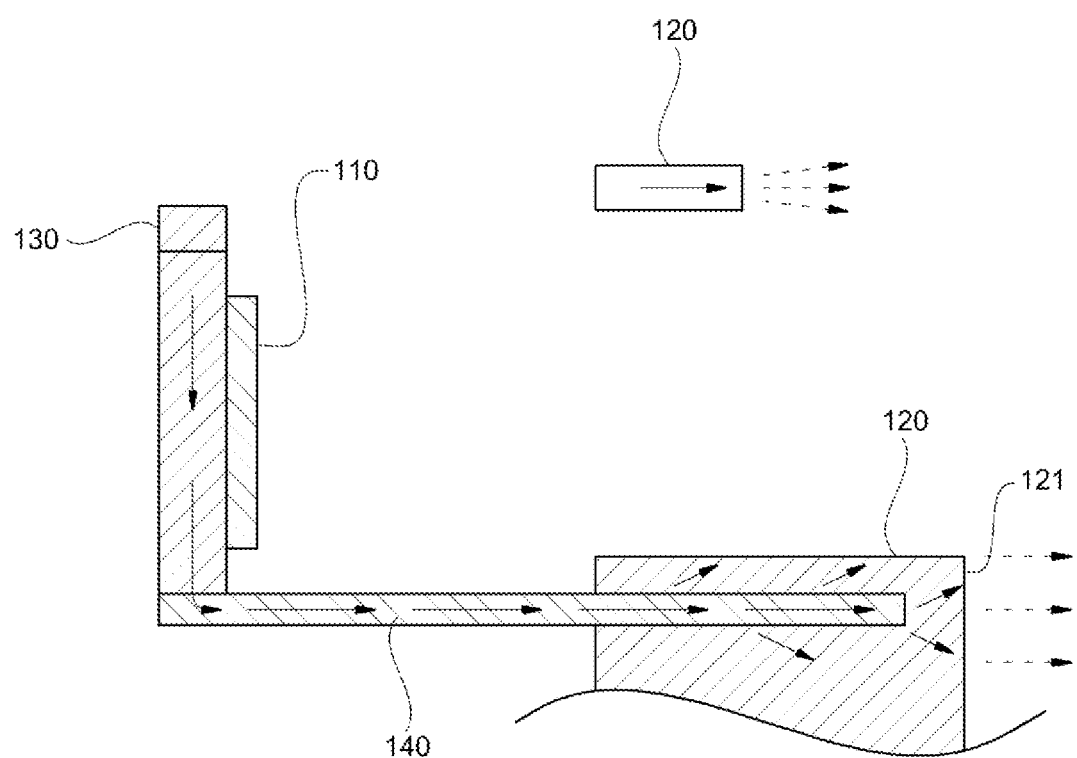
FIG. 2 is a view illustrating a heat sink path of the vehicle lamp illustrated in FIG. 1.
Figure 3:
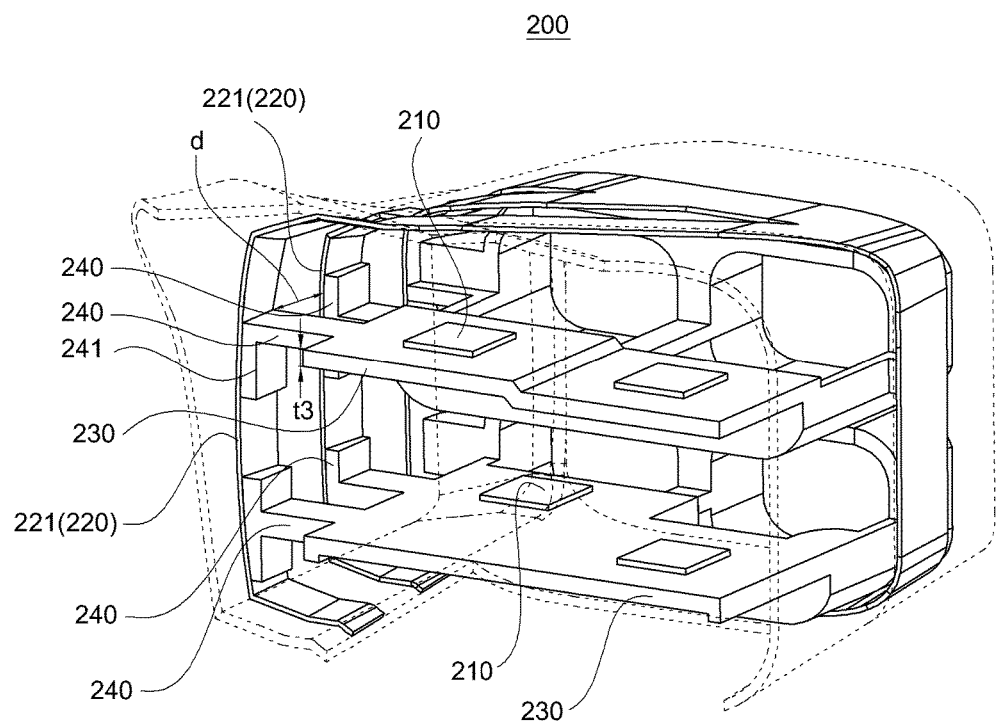
FIG. 3 is a view illustrating a vehicle lamp according to a second exemplary embodiment of the present invention.
Figure 4:
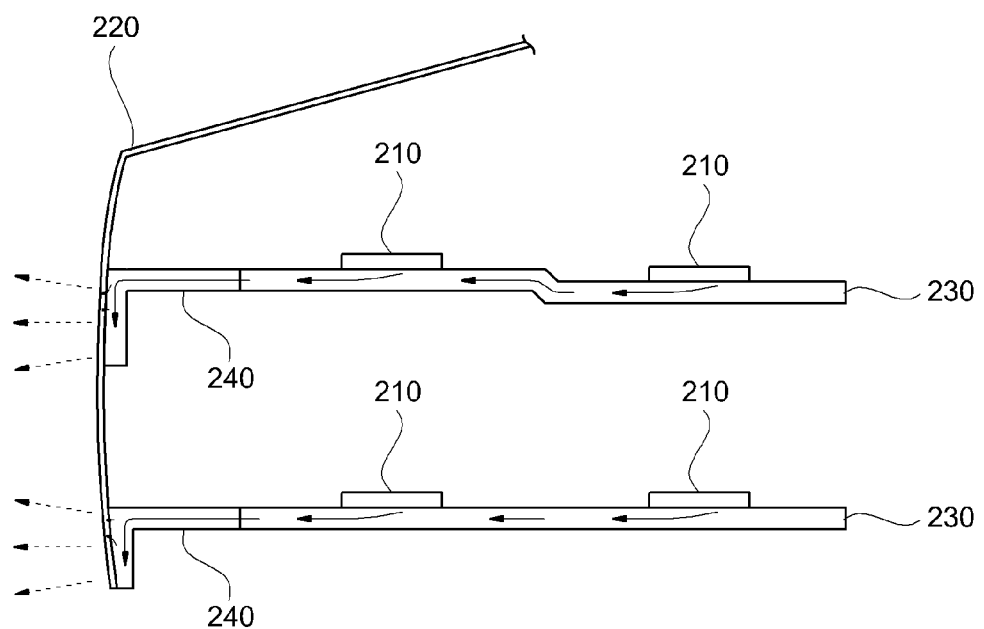
FIG. 4 is a view illustrating a heat sink path of the vehicle lamp illustrated in FIG. 4.

FIG. 1 is a view illustrating a vehicle lamp according to a first exemplary embodiment of the present invention, FIG. 2 is a view illustrating a heat sink path of the vehicle lamp illustrated in FIG. 1, FIG. 3 is a view illustrating a vehicle lamp according to a second exemplary embodiment of the present invention, and FIG. 4 is a view illustrating a heat sink path of the vehicle lamp illustrated in FIG. 4.

FIGS. 1 to 4 are views clearly illustrating main features for a clear conceptual understanding of the present invention, and as a result, various modifications are expected and the scope of the present invention is not limited to specific shapes illustrated in the drawings.

Referring to FIGS. 1 and 2 together, a vehicle lamp 100 according to the first exemplary embodiment of the present invention may include light sources 110 which are arranged in a length direction, a bezel unit 120 made of a thermally conductive material, radiation plates 130, and insert units 140.

The light source 110 may include an LED, and the plurality of light sources 110 may be disposed to be arranged in lateral and longitudinal directions. Light emitted from the light sources 110 may be combined to generate a predetermined light discharge pattern.

The bezel unit 120 may be formed to be elongated along the light sources 110 so that sockets, in which reflectors are formed, are provided to correspond to positions of the light sources 110. The bezel unit 120 may be formed to be divided into a region in which a part of the bezel unit 120 is horizontally formed and a region in which another part of the bezel unit 120 is vertically formed to respectively correspond to a region in which some of the light sources 110 are arranged in a width direction and a region in which the other of the light sources 110 are arranged in a height direction.

The bezel unit 120 may be made of a thermally conductive material and thus include a predetermined thermal radiation region 121. The thermal radiation region 121 is disposed to face a lens and serves to discharge heat transferred from the LED into the atmosphere through thermal radiation.

The light source 110 is mounted on the radiation plate 130. Heat generated by the light sources 110 is conducted to the radiation plates 130.

A rear end portion of the insert unit 140 may be coupled to the radiation plate 130 and a front end portion thereof may be coupled to the bezel unit 120 to serve to conduct heat generated by the light source 110 to the bezel unit 120. Here, the insert unit 140 may be perpendicularly coupled to the radiation plate 130.

As illustrated in FIG. 2, heat generated by the light source 110 is transferred to the bezel unit 120 through the radiation plate 130 and the insert unit 140 in a thermal conduction manner. The heat transferred to the bezel unit 120 is discharged to the atmosphere through the thermal radiation region 121 by way of thermal radiation. Since the heat of the light source 110 is discharged to the atmosphere by way of thermal radiation, a radiation fin or fan for forced convention can be eliminated.

Here, a ratio of a thickness t1 of the radiation plate 130 to a thickness t2 of the insert unit 140 may be 5:2 to effectively conduct heat from the radiation plate 130 to the insert unit 140. For example, when the thickness t1 of the radiation plate 130 is 5 mm, the thickness t2 of the insert unit 140 may be 2 mm. These numerical values are for reducing weight and securing heat sink performance of a vehicle lamp.

Referring to FIGS. 3 and 4 together, a vehicle lamp 200 according to the second exemplary embodiment of the present invention may include light sources 210 which are vertically arranged, a bezel unit 220 made of a thermally conductive material, radiation plates 230, and insert units 240.

The light source 210 may include an LED, and the plurality of light sources 210 may be vertically disposed to be provided in a multilayer structure.

The bezel unit 220 may be formed to surround the light sources 210, and a side surface of the bezel unit 220 may include a plurality of side ribs 221 disposed to be spaced apart from each other. Such a form of the bezel unit 220 serves to reduce a weight of a vehicle lamp. In addition, the bezel unit 220 may be made of a thermally conductive material to include a predetermined thermal radiation region which discharges heat to the atmosphere through thermal radiation.

The radiation plates 230 may be horizontally disposed in a multilayer structure. The plurality of light sources 210 may be mounted on each of upper and lower layers of the radiation plates 230. Heat generated by the light source 210 is conducted to the radiation plate 230.

One end portion of the insert unit 240 may be coupled to the radiation plate 230 and the other end portion may be coupled to the bezel unit 220 to serve to conduct heat generated by the light source 210 to the bezel unit 220. Here, the insert unit 240 may be horizontally coupled to each of the upper and lower layers of the radiation plate 230 and perpendicularly coupled to the bezel unit 220. In addition, the end portions 241 of the insert unit 240 may be formed to be bent to increase a contact area between the bezel unit 220 and the side ribs.

As illustrated in FIG. 4, heat generated by the light source 210 is conducted to the bezel unit 220 through the radiation plate 230 and the insert unit 240 by way of thermal conduction. The heat transferred to the bezel unit 220 is discharged to the atmosphere through the thermal radiation region by way of thermal radiation. Here, a ratio of a thickness t3 of the radiation plate 230 to a separation distance d between the insert units 240 may be 1:2 to reduce a weight of a vehicle lamp and effectively conduct heat from the radiation plate 230 to the insert unit 240. For example, when the thickness t3 of the radiation plate 230 is 3.5 mm, the separation distance d between the insert units 240 may be 7 mm. These numerical values are for reducing weight and securing radiation performance of a vehicle lamp.

The vehicle lamp according to one exemplary embodiment of the present invention has been specifically described above with reference to the accompanying drawings.

While the present invention has been particularly described with reference to exemplary embodiments, those skilled in the art should understand that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

REFERENCE NUMERALS

100, 200: VEHICLE LAMP
110, 210: LIGHT SOURCE
120, 220: BEZEL UNIT
130, 230: RADIATION PLATE
140, 240: INSERT UNIT

The invention claimed is:

1. A vehicle lamp comprising:
a plurality of radiation plates horizontally provided in a multilayer structure that includes an upper radiation plate and a lower radiation plate;
a plurality of light sources respectively mounted on top surfaces of the radiation plates;
a plurality of insert units, each of the insert units including:
a first end portion that is directly connected to a side surface of a corresponding one of the radiation plates and extends from the side surface to be coplanar with the corresponding one of the radiation plates, and
a second end portion that extends transversely to the radiation plates and the first end portion; and
a bezel unit that is directly connected to the second end portions of the insert units,
wherein each of the side surfaces of the radiation plates is thermally coupled to the bezel unit by two or more of the insert units that are spaced apart from each other,
wherein the bezel unit includes a plurality of side ribs that are spaced apart from each other and extend in parallel and transversely to the radiation plates and the first end portions of the insert units,
wherein two or more of the side ribs connect ones of the insert units connected to the upper radiation plate and other ones of the insert units connected to the lower radiation plate,
wherein each of the side ribs is made of a thermally conductive material and includes a thermal radiation region, and
wherein a ratio of a thickness of the radiation plates to a separation distance between the insert units is 1:2.

2. The vehicle lamp of claim 1, wherein the insert units and the radiation plates are made of aluminum.

3. The vehicle lamp of claim 1, wherein the light sources include a light emitting diode.

4. The vehicle lamp of claim 1, wherein the first end portions of the insert units connected to the side surface of the radiation plates are perpendicularly coupled to the second end portions of the insert units connected to the bezel unit.

5. The vehicle lamp of claim 1, wherein the upper radiation plate includes a curved portion such that a first one of the light sources mounted to upper radiation plate is positioned at a first horizontal plane, and a second one of the light sources mounted to upper radiation plate is positioned at a second horizontal plane that differs from the first horizontal plane.

6. The vehicle lamp of claim 1, wherein the insert units are formed to be bent between the first end portions and the second end portions.

7. The vehicle lamp of claim 1, wherein the second end portions of the insert units are in surface contact with the side ribs.

* * * * *